(12) United States Patent
Bell (10) Patent No.: US 9,010,654 B2
(45) Date of Patent: Apr. 21, 2015

(54) MONITORING MOVING ARTICLES (75) Inventor: Alan Joseph Bell, Fareham (GB)

(73) Assignee: Wessex Technology Opto-Electronic Products Limited, Waterlooville, Hampshire (GB)

( * ) Notice: Subject to any disclaimer, the term of this patent is extended or adjusted under 35 U.S.C. 154(b) by 0 days.

(21) Appl. No.: 14/114,384

(22) PCT Filed: Apr. 27, 2012

(86) PCT No.: PCT/GB2012/050949
§ 371 (c)(1),
(2), (4) Date: Jan. 13, 2014

(87) PCT Pub. No.: WO2012/146942
PCT Pub. Date: Nov. 1, 2012

(65) Prior Publication Data
US 2014/0217177 A1 Aug. 7, 2014

(30) Foreign Application Priority Data
Apr. 28, 2011 (GB) .................................. 1107191.7

(51) Int. Cl.
G06K 19/06 (2006.01)
G06Q 30/00 (2012.01)
G06K 1/12 (2006.01)
B65C 9/46 (2006.01)
G06Q 10/08 (2012.01)
G06Q 30/06 (2012.01)
G06T 7/00 (2006.01)

(52) U.S. Cl.
CPC ............ *G06Q 30/0185* (2013.01); *G06K 1/121* (2013.01); *B65C 9/46* (2013.01); *G06Q 10/08* (2013.01); *G06Q 30/06* (2013.01); *G06T 7/001* (2013.01); *G06T 2207/30108* (2013.01)

(58) Field of Classification Search
CPC combination set(s) only.
See application file for complete search history.

(56) References Cited

U.S. PATENT DOCUMENTS

| 8,348,146 | B1 * | 1/2013 | Aurich ........................... 235/375 |
| 8,534,543 | B1 * | 9/2013 | Eker et al. ..................... 235/375 |
| 8,714,442 | B2 * | 5/2014 | Sharma et al. ................ 235/376 |
| 2012/0005105 | A1 * | 1/2012 | Beier et al. .................... 705/303 |

FOREIGN PATENT DOCUMENTS

WO 2008/153503 A1 12/2008

* cited by examiner

*Primary Examiner* — Christle I Marshall
(74) *Attorney, Agent, or Firm* — Dicke, Billig & Czaja, PLLC (57) ABSTRACT

A system of monitoring movable articles, e.g. for detecting counterfeits, is described. It comprises applying to the article (30) a label thereon, coded data in the form of a visually perceptible marking (34) conveniently at the time and place of manufacture and using a digitally controlled printer. Details of the marking are stored in a high capacity memory store. When it is desired to monitor the article, a pictorial image of the marking is sent from the location of the article to a remote computer (37) via a wide area communications network, such as a mobile telephone network (50). Details concerning the location of the article are also transmitted to the remote computer, which is programmed, to extract the coded data from the transmitted image file, and evaluate whether the coded data matches coded data stored in the high capacity memory store. If there is a match, the item is genuine and the remote computer can return a message to that effect.

10 Claims, 8 Drawing Sheets

MONITORING MOVING ARTICLES

This invention relates to monitoring movable articles and, in particular, to monitoring and checking articles for genuineness, e.g. to enable counterfeit goods to be easily identified as such, or to detect forged documents.

There is a wide variety of goods in commerce which are subject to imitation and counterfeiting. The genuine manufacturers of such goods have developed a number of ways of seeking to identify the goods themselves in a way which is difficult for counterfeiters to emulate. Such approaches, however, often mean that it is not only difficult for the counterfeiters to emulate, but difficult for the genuine trader or, for example, for a customs authority, shipper or eventual customer, to check whether the items in question are genuine. This is particularly the case where particular materials such as special security inks or holograms are used. An additional problem with such approaches is that while commercial secrecy may avoid whatever is adopted by the genuine manufacturer being adopted by the counterfeiter for some time, sooner or later the information escapes, and it is then available for the counterfeiter to use.

WO-2008/065649 discloses an authentication system for articles which involves placing a coded marking on them which consists of a challenge code and a response code— usually a set of numbers. The challenge code can be read by someone wishing to check authenticity and transmitted to a remote computer using a mobile telephone handset. The challenge code is received by the remote computer, checked to see if valid and the remote computer then sends a message back to the mobile telephone including a 'response code'. If the response code matches the response code on the product, it is deemed authentic. The mobile telephone handset may be equipped to retrieve the challenge code from an RFID tag on the product automatically. Such a system requires RFID tags and a special telephone handset in order to operate it.

We have now found that by checking and monitoring movable objects which are labelled in a particular way, very substantial advantages may be obtained without the need to use complex or secret technological solutions to discriminate between genuine and counterfeit goods, and to do so in a simple and effective fashion making use of known technology.

At the heart of the present invention lies the use of a label, or more generally a marking applied to the goods in question, which contains a decodeable unique identifier. Such decodeable unique identifiers may be generated using computer software and converted into a visually perceptible marking which does not need to use any special technology in order to print or otherwise apply it to an article or, for example, to its packaging on to a label.

By using a decodeable unique identifier, simply referred to hereunder as a "coded marking", in this way, it is possible to construct a system where the unique identifier is associated with the goods at or shortly after manufacture, and which then travels with the goods subsequently. There is, however, no need for specialist equipment to check any given label because all that is necessary is to transmit an image of the label to somewhere where it can be checked. Thus, the monitoring and checking of an article can be carried out remotely from the article itself, and can be done in a secure environment which will normally be owned or controlled by the genuine manufacturer.

According broadly to the present invention, there is provided a system of monitoring movable articles which comprises applying to the article or a label thereon coded data in the form of a visually perceptible marking, conveniently at the time and place of manufacture, storing details of the marking in a high capacity memory store, transmitting a pictorial image of the marking from the location of the article to a remote computer via a wide area communications network, transmitting simultaneously details concerning the location of the article to the remote computer, retrieving the coded data from the transmitted image file, and evaluating whether the coded data matches coded data stored in the high capacity memory store.

The transmission of image data from the label and the location of the label is preferably effected by using a "Smartphone" device, i.e. a mobile telephony unit equipped with a camera and a system for detecting and reporting its location. Such Smartphones are widely available in commerce, for example under the registered trade mark designations iPHONE and ANDROID. Alternatively, a mobile computing device with a built-in camera, for example as sold under the trade mark iPad, may also be used connecting directly to the internet.

It will be appreciated that the use of the worldwide mobile telephony or internet system in this way not only enables a manufacturer to receive details of the location and identity of articles, but to transmit back to the sender of the data a message reflective of the evaluation, which can be carried out purely automatically, as to whether the article or label on it is a genuine one or a copied one depending upon the image of the identifier recorded at the time and place of manufacture and the image of the identifier taken later, e.g. at the time of sale, or while the goods are in transit, for example at a customs checkpoint.

If, for example, a label, applied to the packaging of a high value consumer item such as a designer handbag, where the label was applied to the bag and its packaging in connection with a consignment of goods manufactured in Italy and for sale in North America, appears when checked by a customs officer to be passing through customs in Australia, the officer may be instantly alerted to this and accordingly able to detain the goods while the matter is subject to further checking.

It will be appreciated that a major advantage of the system in accordance with the invention is that the relevant coded data about the goods associated with the genuine marking are securely stored at an appropriate location known only to the genuine manufacturer. This can, of course, be in its own computer systems, or it can be in a separate secure computer environment to which it alone has access, or preferably at a third party provider of security marking services, as this allows manufacturers or manufacturers' subcontractors to benefit from the increased product security without the need for them to have sophisticated IT knowhow and skills. Accordingly, data security may be relatively easily maintained.

Deployment of the system in accordance with the present invention is straightforward insofar as all that is necessary is to equip the Smartphone or the like with an appropriate programme which will carry out the necessary operations when desired. Such programmes are easily distributed via the Internet itself and are commonly known as "Apps". The system envisaged in accordance with the invention essentially requires a simple application which can be rapidly downloaded and which acts as explained above to take a picture of the label which the holder of the Smartphone wishes to check and transmit that picture and the location of the Smartphone to a secure server environment via the mobile phone system and, normally, the Internet.

The coded marking in question may be on a label, on an item of merchandise itself, such as a label attached to a handbag, or on the immediate packaging for such an item, on a packing container, crate, box or the like containing a plurality of such items, and/or on shipping or other commercial documentation, such as the invoice related to the items in question. The marking can usually be produced using standard label manufacturing or printing equipment, so long as the system for producing the labels will produce ones with an appropriately individualised content, i.e. each label must be different in a given way. This may be ensured, for example, by including some randomly generated data or feature in the marking. The randomly generated data may be intentionally included, e.g. by including a printed randomly generated alphanumeric sequence of a few to several characters, or it may be included by way of random variation arising during the label manufacture.

A common method of marking articles directly is Continuous Ink Jet Print (CIJP), for example using a Domino (Registered Trade Mark) A400 series printer. These printers are normally used for adding production information to consumer goods, they have advantages that include the ability to print on surfaces that may not accept "stick-on" labels and the production line does not need to stop whilst the marking is applied. The characters printed by a CIJP device are formed as a matrix of dots, and although the device is intended to print evenly and with exact replication of the intended characters or other markings, differences between one print and the next inevitably arise, particularly as the printing is applied "on the fly", i.e. while the article is moving past a (fixed position) print head forming part of the CIJP printer. As well as this imprecision, other artefacts such as random ink splashes around CIJP printed data can serve as a suitably random feature.

Accordingly, it is not necessary for the label printing or article manufacturing system to "know" or be provided by way of data input with all of the relevant data. A label print system may be set to include some specifically generated random data, e.g. derived from a random number generator and converted into a random sequence of alphanumeric characters, so that each label will differ from the rest—provided sufficient randomised data is used, the chances of two labels being printed the same are vanishingly small. Alternatively or additionally, random markings, such as ink splashes, may be applied. After the manufacturing and labelling has occurred, the coded data for storage by the genuine manufacturer, including both random and non-random components, may be captured and securely stored associated with other data relating to the item itself.

In the case of certain products, the coded marking need not be on a label separate from the article, but rather it can be printed on it, or even, for example, embossed, though this last approach may need some physical manipulation to provide a transmissible image, for example rubbing a flat graphite or like marker plate across a piece of white paper held over the embossed image to provide an easily visible black-and-white image which may then be imaged and transmitted using a mobile telephone system.

One way of putting the invention into practice is described in more detail in what follows, with reference to the accompanying drawings in which.

In this description, for ease of reference, the coded marking is described by the acronym CMOMO, Coded Marking on Movable Objects. A CMOMO may be thought of simply as a digital signature for physical items.

An especially valuable use of a CMOMO is to protect Brand Owners and buyers from counterfeit products and grey market imports. The CMOMO can be applied to products, their packaging and to supporting documents such as delivery notes, invoices and packing lists.

It is of particular value to provide, as well as a CMOMO, an easily identifiable distinctive visual sign, for example a logo, to indicate immediately to any interested party viewing the CMOMO that they can instantly check the authenticity of the product which bears it or with which it is associated As noted above, the CMOMO may be thought of as a digital signature for products and documents. It can be applied to conventional product labels at the same time as a product code and serial number, using the existing printer, label and ink that the product producer usually uses. Four ways in which a CMOMO can be implemented are described below. These four are 1: Where the product or article in question carries a product label, either as a tag (for example on a handbag) or on packaging, for example a cardboard box containing a blister pack of pills.

2: Where the product normally carries a label including a UPC barcode.

3: Where the product carries or is labelled with a label carrying a data matrix or other 2-dimensional code e.g. applied directly to an electronic component or 4: Where no suitable label exists.

Figure 1:
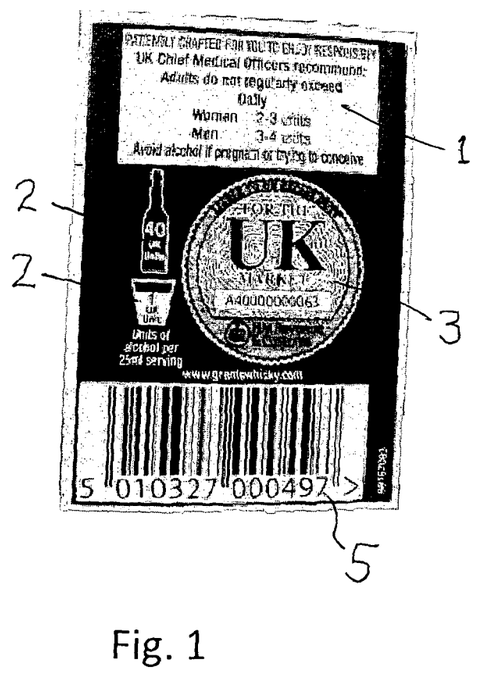
FIG. 1 is a picture of a typical product label.
Figure 2:
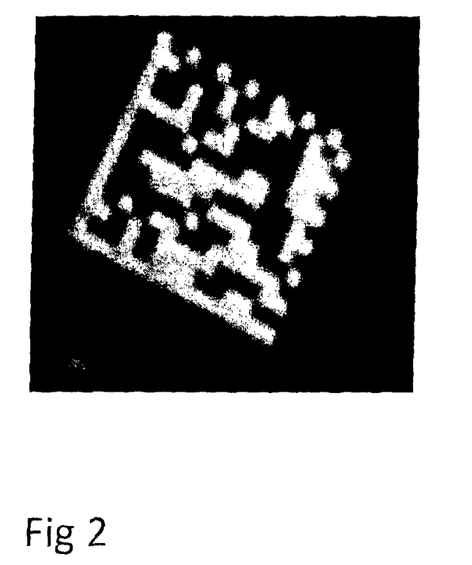
FIG. 2 is a representation of a data matrix code.

1. Product Labels:

Such labels are normally well defined, made from conventional materials with normal printers—each label may contain at least a product code and a serial number or a batch code. A typical product label is shown in FIG. 2. In the label illustrated, which is designed to be placed on the side of a bottle of spirits opposite the "main" label which is mainly pictorial and reflects the brand and type of spirits in question, there are various areas containing different types of information. In the label illustrated, there is a user advice box 1, two content advice icons 2, a certification marking from the customs authorities 3, the url of the manufacturer 4, and a UPC barcode 5.

A brand owner wishing to use a CMOMO may do so simply by adding some random data to the label (or to the glass adjacent the label); the image of the label (and any adjacent marking) including the random data may then be stored on a server which is programmed to build up an archive in the form of a secure data base.

It should be noted that even a criminal intrusion into the brand owner's manufacturing system by someone seeking to find the key to the random data does not compromise the security of the system's protected products if the random data is properly created.

The random data can be devised in any way the brand owner chooses: for example, it could be the combination of other data on the label, totally random numbers or letters or a series of random patterns incorporated into the label or product design.

Normally, each product from a particular manufacturer will use a particular label style, one form of which is shown in FIG. 1. When the product is to be checked using a system according to the present invention, this can be usefully rendered more efficient if, along with the coded data, the server also stores data corresponding to that label style, which will include data relating to the position of the various components of the label, denoted 1 to 5 in FIG. 1, or, for example, a serial number, and data corresponding to the random data forming part of the marking on the label.

To check that a product is genuine, the person checking takes a picture of the label, for example using a smartphone device running a suitable App. This picture, together with time and location information provided by the App, is sent to the remote computer. This retrieves the coded data from the picture and compares it with data stored in the high capacity memory store. If there is a match, then the product is validated; if not, the product is fake, or genuine but diverted. The result of the comparison can be immediately transmitted back to the smartphone of the person checking, for example a customer or a Customs Officer.

Additionally, when such an attempt at validation takes place, the remote computer may be programmed to advise the brand owner where and when the attempt at validation has occurred and who made the attempt, enabling the brand owner to learn if material intended for one market has been diverted to another as a grey import or, for example, is being sold past its "use by" date.

The customer or Customs Officer instantly knows whether the goods being examined are genuine or fake. In the case of the Customs Officer, he or she will also know that should a decision to prosecute be made, there already is photographic evidence to use in support of any such prosecution.

It should be noted that the App used in a smartphone in such a way contains nothing that can compromise the security of the brand owner or the protected product. It is simply designed to enable the smartphone to take the picture and send the picture with the phone location, local time and (with appropriate consent) owner information to the remote computer. Thus an algorithm which could be used to produce the random data is never part of the App.

As well as use of the system by customers and customs officers, the system can be used by individuals who may, entirely legitimately, wish to dispose of an item they have bought via an online auction site. The seller takes the image of a label including the CMOMO and transmits this to the auction site which then transmits it on to the remote computer for validation. If validation occurs, then the auction site page may then carry e.g. a "certified genuine product" icon or inscription to indicate that the product being sold is an authenticated product. The brand owner may also receive, at the same time, a notification of the authenticated product being listed.

If a particular brand owner desires to use the system in connection with products produced in batches, then a single batch number will apply to several units of the same product produced. In this case, the CMOMO can incorporate a combination of sequential data and random data to maintain the uniqueness of each image of each label. Also the manufacturer could still uniquely identify each outer carton.

Further aspects of the validation process are explained in more detail below with reference to FIGS. 8 and 9.

2. Where the Product Label Carries a UPC Barcode

The UPC barcode is the Unique Product Code that supermarkets use when scanning items at the checkout. One forms part of the label shown in FIG. 1, denoted 5. The remote computer can easily extract UPC barcode data from an image of a label containing a UPC barcode, initially to see if that product is one which uses the system. If so, the UPC barcode data can be used to retrieve label template data making it then easier to locate and then read other data on the label, for example a serial number and random data incorporated into the label.

In the case of labels bearing a serial number, once the remote computer has read the serial number from the image of the label, it requests the corresponding production image for that serial numbered label from an image database, and it can then check if the random data from the production image matches that in the label of which it has just received the image.

3. Where the Product Carries or is Labelled with a Label Carrying a Data Matrix or Other 2-Dimensional Code In recent years, a family of 2D barcodes that can carry a lot of information has been developed. The following description illustrates how data matrix codes can be used in the system according to the present invention, but it can apply equally to other types of 2D barcodes.

FIG. 2 shows a typical data matrix code, which takes the form of a checker board pattern. Such codes are increasingly found on a wide range of engineering products. These codes are designed to be read by computer and carry alphanumeric data. The internationally agreed standards for data matrix codes mean that when scanned by a laser scanner, the data generated can be subjected to treatment with powerful error detection and correction algorithms, which are designed to allow the data to be recovered even if, for example, the printed information is damaged and some of the elements are missing, or contamination on the surface of the product causes a "black" pixel to be seen as "white" or vice versa.

The data matrix 2-D barcode shown in FIG. 2 has 144 individual cells; "flipping" the colour of just two cells would produce over 20,000 combinations of possible random data, while not compromising the standard functioning of the barcode relative to the product and its manufacture and identification.

Typically a data matrix code will contain data relating to the part number, manufacturer and lot numbers or serial numbers. Different manufacturing businesses have already made significant investments into robotic manufacturing processes that rely on these codes.

In order to use data matrix codes in the system according to the present invention, random data is added to the data matrix code. The precise form of such addition can vary according to the way that data within the code is designed to be used.

For example, in an implementation with unused data fields, the random data can be simply added to the code symbol and extracted like any other data. In an implementation where all of the data fields are used, adding new data to the existing data matrix code could be expensive. An alternative method of adding a random element to the data matrix code is deliberately to "flip" a small number of squares within the pattern. The existing data matrix readers will correct these bits and be unaffected by the deliberate inclusion of a small number of errors. However, the remote computer used in the system according to the invention can use these 'errors' to activate validation.

In an alternative approach, if the implementation is already error-prone due to surface contamination, the printer which applies the data matrix code can be driven to offset the position of the code by a random amount relative to a known feature, for example a nearby edge. The remote computer software need only measure the relative position of the data matrix code and the known feature to achieve validation.

Alternative random data can be added by printing arbitrary data or patterns some distance from the data matrix code in defined areas.

In all of these cases the remote computer is programmed to read the data matrix code shown in the image sent by the smartphone, and determine the product code, and if the product is one using the system, then the nature of the random data will be recovered from the high capacity memory store.

4. Where No Existing Label can be Used

In some situations it is impractical to use an existing label, for example a blister pack of pills, or vials of liquid pharmaceutical products may be supplied in bulk to a hospital but the individual internal dispensing packaging may still require proof of origin. In these situations a CIJP can be used to create a CMOMO that includes a distinctive logo to identify the data and data itself containing sufficient information to uniquely identify and validate each blister pack as genuine.

In many production line manufacturing operations, it is common practice to apply to products, their containers, or labelling on either, details relating to the production, for example a batch or lot number, production data, "use by" date or an identifier showing which production line was being used. Such an application commonly takes place using a CIJP printer, but sometimes a contact printer may be used for this purpose. Such printers apply a marking such as that shown in FIG. 3, which has fields showing the manufacturing month, 12, the batch No, 13, the time, 14, and the date, 15.

Figure 3:
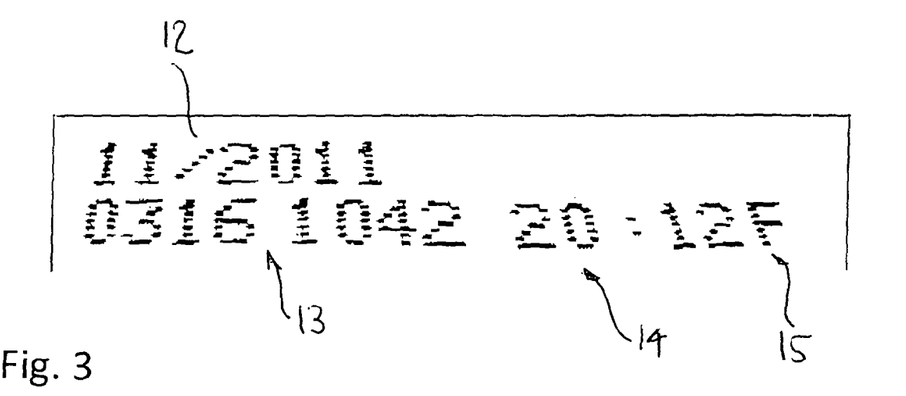
FIG. 3 is a representation of a CIJP printed marking applied online during manufacture of a batch of products.

In applying the system of the present invention, a CIJP printed marking may be used, applied at the same time as the marking shown in FIG. 3.

Figure 4:
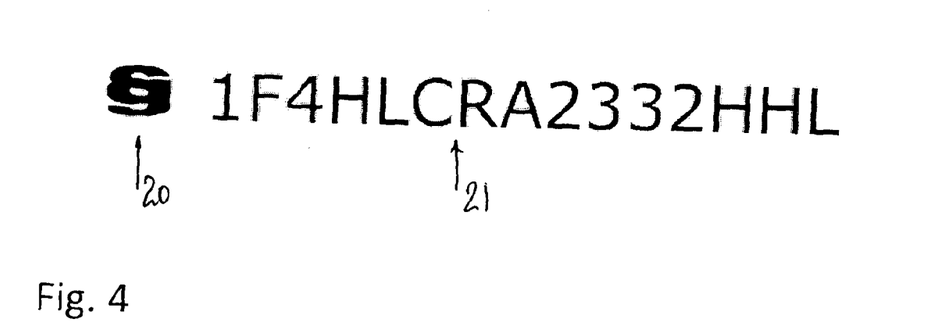
FIG. 4 is an illustration of a combined marking including a recognisable logo and a coded alphanumeric mark.

When putting the invention into effect, in this way, it is highly preferred to apply, using the CIJP printer, both a visually perceptible marking containing the coded data, and a fixed spatial relationship to that marking, an unencoded highly machine recognisable marking which can assist in enabling rapid error-free processing of the coded data. Such a marking may be a 'typographic' character formed analogously to typographic characters of a standard set used to print other parts of the article or label, but which does not form part of that standard set, e.g. an invented 'letter' or a letter from a different alphabet, such as a Greek letter, where the standard set is Roman. One example of such a combined marking is shown in FIG. 4, which consists of a symbol, denoted 20, to the left of an alphanumeric code number denoted 21.

Figure 5:
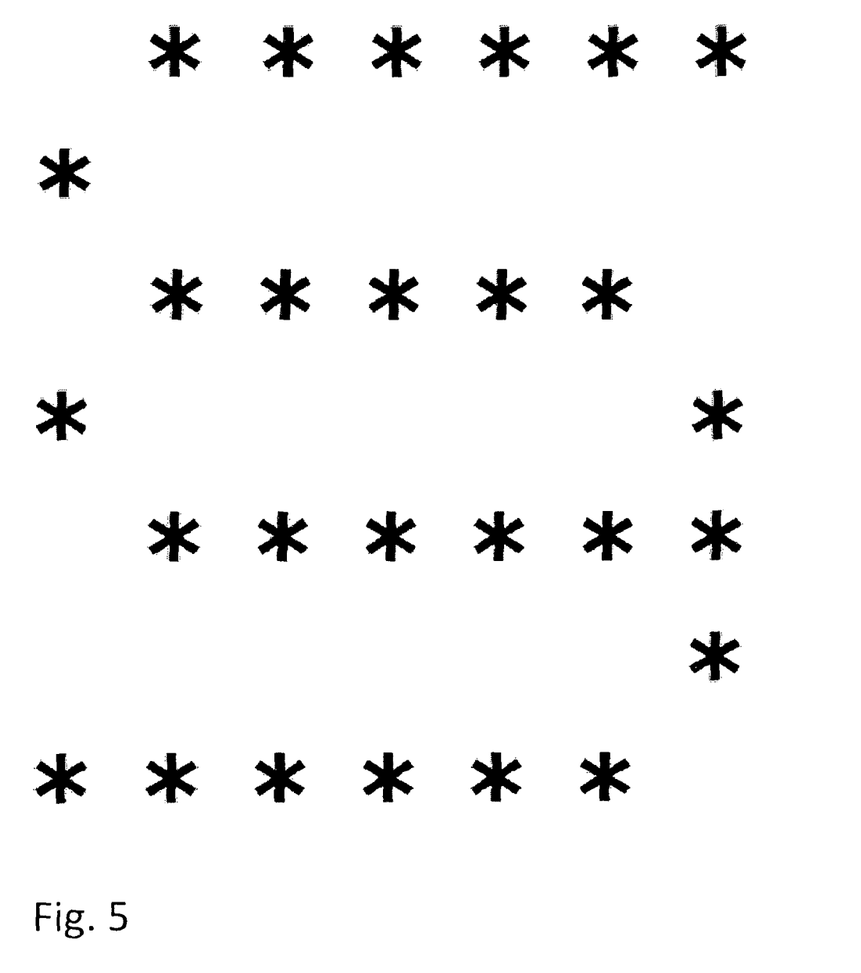
FIG. 5 is a dot-matrix representation of part of the marking of FIG. 4.

The symbol 20 is carefully designed to be unique and easy to find in an image of a label that contains other information. The symbol 20 shown in FIG. 4 consists of a superimposed lower case "s" and lower case "g". Such a symbol can be printed as an image using the sort of printing technology which is commonly adopted in laser printers, or it can be printed using a CIJP type of printer where the dots are arranged as shown in FIG. 5. The symbol 20 is easily detected using standard optical character recognition software, particularly as the standard European character set does not contain any character with four horizontal bars. Accordingly, OCR software used to scan a label, or other printed material carrying a reproduction of symbol 20, will detect the occurrence of four equally spaced rows when scanned vertically one line at a time. This provides an indicator of the location and direction of the coded number 21 which lies to the right of symbol 20 in FIG. 4.

The remainder of the marking, i.e. the coded alphanumeric number 21, can then be read with ease and the resulting data passed to the relevant programme to decode it.

One way of producing the coded alphanumeric number 21 is to combine together a product number, allocated by the manufacturer to the product in question, a lot number, which corresponds to the particular manufacturing lot, and random data. This may be done by using suitable coded numbering generation software using Reed-Solomon arithmetic.

Reed-Solomon arithmetic was developed many years ago to protect the integrity of data by correcting errors that occur in storage or transmission. It is used in many situations—mobile telephones, DVD players and barcodes on mail. It works by adding extra digits (parity data) to the data being protected. The parity data is calculated when the message to be protected is stored or transmitted. The arithmetic may be applied to values expressed in any convenient base. For example, it may be used to process base 23 arithmetic where the conventional Arabic numbers 0-9 and a section of alphabetic characters are used to form a set of 23 different symbols, as follows:

| Character | Value |
|---|---|
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| A | 10 |
| C | 11 |
| F | 12 |
| H | 14 |
| L | 14 |
| M | 15 |
| N | 16 |
| R | 17 |
| T | 18 |
| V | 19 |
| W | 20 |
| X | 21 |
| Y | 22 |

In this table, the alphabetic symbols used have been selected to minimise common OCR (optical character recognition) problems, for example the confusion between "1" and "I", or "0", "O" and Q is avoided by not using the letters "I", "O" or "Q" as symbols.

The number 21 may vary in length depending upon the application, with longer number 21 naturally being able to contain more encoded data. For example, a relatively short number 21 may be 15 digits long, with the first nine digits representing the 12-digit UPC code for the product concerned, and the remainder being parity data. Encoding using Reed-Solomon arithmetic is carried out according to the formula:

$$UPC = C_{14} + C_{13} + \ldots + C_7 + C_6$$

$$\text{Parity Data} = C_5 \ldots C_0$$

A longer version of the number 21 may be, for example, 23 digits long, with the first six digits being used by the brand owner to include lot or serial number information. Two additional digits are allocated to parity data, and the Reed-Solomon formula assigned is then:

Brand Owner Data=$C_{22}+C_{21}+\ldots+C_{18}+C_{17}$

UPC=$C_{16}+C_{15}+\ldots+C_9+C_8$

Parity Data=$C_7\ldots C_0$

The UPCA code contains 12 digits that allow 999,999,999,999 uniquely identified products. Any number between 0 and 999,999,999,999 can be represented by 9 digits when represented in base 23 arithmetic.

As explained above, when the system according to the present invention is implemented, the coded number preferably reflects the inclusion of some random data. The random data can be directly included in the brand owner data or by altering one of the numbers in the printed CMOMO. Randomly changing one of the base-23 numbers in this way is similar to flipping one of the data bits in the data matrix code mentioned earlier. In the data matrix code the bit can be flipped from black to white or vice versa. In the example above any of the base 23 digits can be randomly changed to another of the 22 symbols used to represent the data.

In both the data matrix case mentioned earlier and this example the Reed Solomon arithmetic can correct the deliberately introduced random error to allow the data embedded in the CMOMO to be correctly read. At the same time the deliberately introduced error in CMOMO can serve as proof of a matching image or otherwise. Changing the short and long types of coded number 21 can easily be changed by randomly altering a single character, giving at least 345 possible variations in the shorter coded number 21 and 529 variations in the longer 23-digit number.

The combined marking shown in FIG. 4 can be applied not only to product labels, but also to, for example, delivery notes and invoices that conventionally travel with every consignment, so enabling, for example, Customs Officers to check the propriety of a consignment as a matter of routine.

Figure 6:
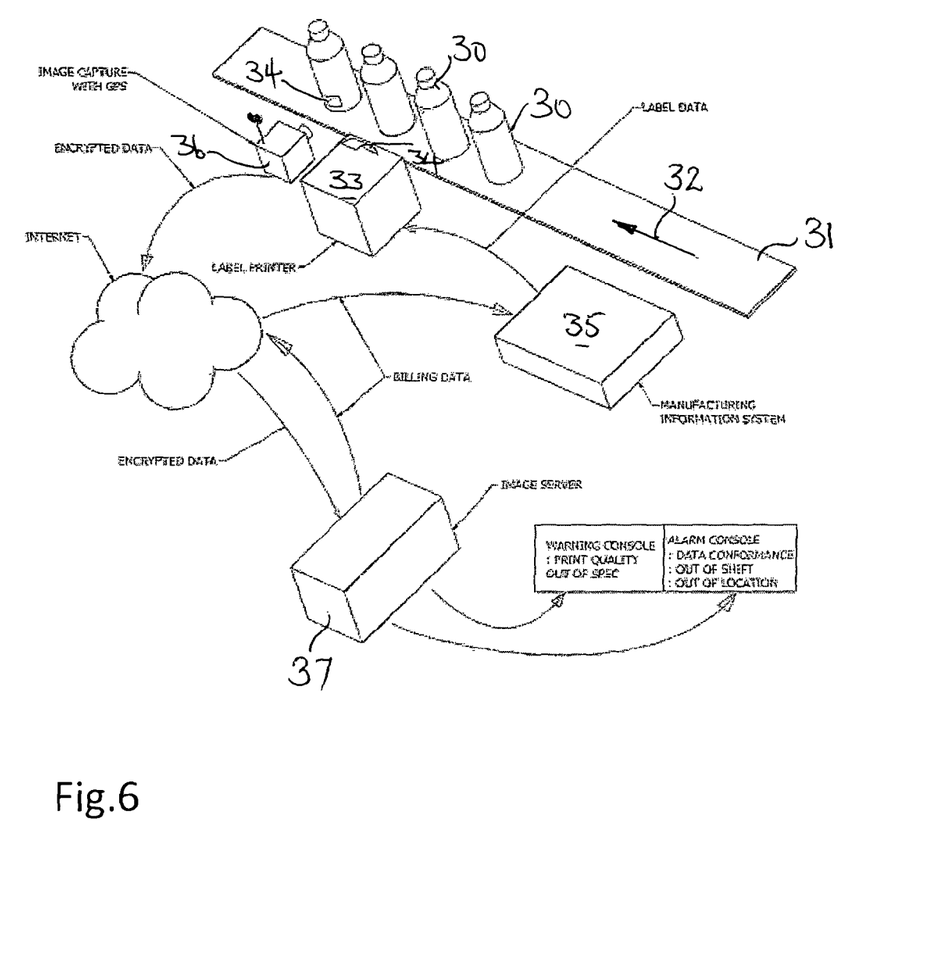
FIG. 6 shows diagrammatically how the marking may be generated and applied to goods on a production line.

FIG. 6 shows diagrammatically the application of a marking of the type shown in FIG. 4 during a production process for the items in question, which are shown as a series of containers 30 moving along on a conveyor system 31 in the direction shown by an arrow 32. Adjacent system 31 is a label printer 33 with means (not shown) for applying successive labels 34 to each container 30 as it passes the printer 33. The data to be printed by printer 33 on to each label 34 is derived from a manufacturing information system 35 forming part of the manufacturing plant.

Downstream of the label application station, each container 30 passes by a specialised image camera which records a "production" image of each label 34 complete with its product code, serial number and random data. The image is encrypted and transmitted to a remote server 37 as part of a secure encrypted package with time, date and geo-location information, reflecting the fact that the label image was captured inside the manufacturer's facility at a time when the production line was authorised to be in operation.

The remote server 37 receives the production image transmitted via the Internet, and is programmed automatically to decrypt the secure package and typically does the following:
   checks that the data package has not been compromised, if the package has been compromised then generate an alarm.
   reads the product code from the production image, and verifies that the camera is authorised and is operating at appropriate times and at an appropriate location—if the camera is out of location or out of time then the server 37 generates an alarm.
   uses the product code to locate a label template showing where the different types of data are printed.
   reads the serial number from the production image.
   checks that the image quality is sufficiently good and that the printed data is legible; if not, it warns the brand owner if the printing is of poor quality.
   stores the encrypted package of information including the production image on a secure server which may be part of server 37 or a separate server, indexed by its product number and serial number for later retrieval.
   generates billing information appropriate for the brand owner.

Figure 7:
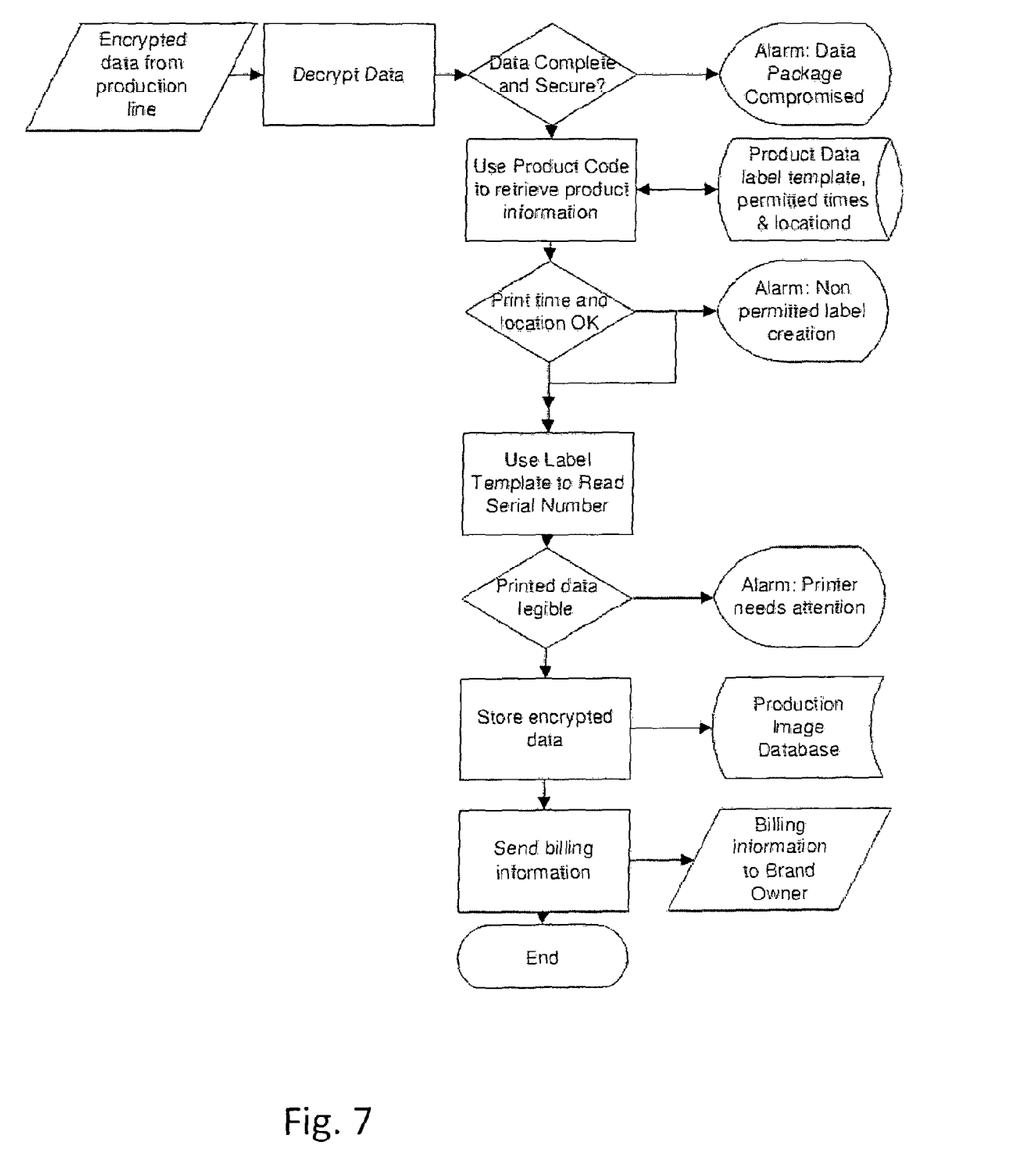
FIG. 7 is a flow chart detailing some of the process steps applying to how the image server would process a captured image of the coded marking in accordance with FIG. 6.

This process is shown as a flow chart in FIG. 7.

Figure 8:
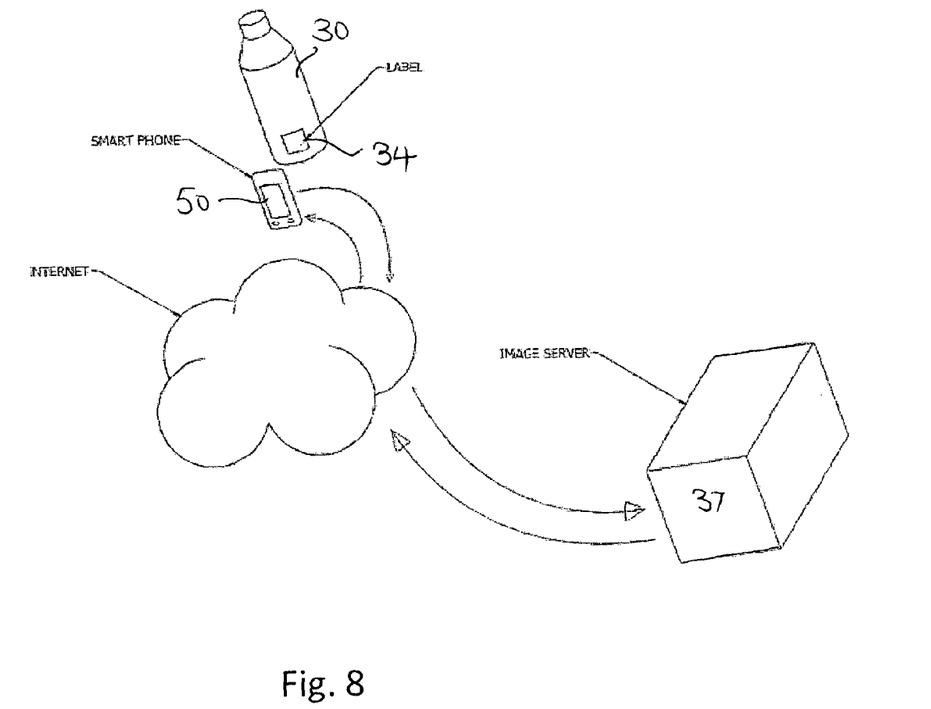
FIG. 8 is a diagram of a validation exercise effected on a labelled product.

FIG. 8 shows diagrammatically the carrying out of a validation exercise on a container 30 bearing a label 34. The person who wishes to check e.g. the authenticity of the labelled container 30 uses a smartphone 50 for this purpose. The smartphone 50 is running a smartphone App which directs the person checking to take a picture (customer image) of the label. The person checking may be a customer, Customs Officer or anyone with the relevant App on their phone.

When actuated, the App does the following:
   encrypts the Customer Image of the label.
   sends the encrypted image as part of a secure package to the server 37, the package including the time and date information. Depending on privacy settings, the smartphone owner's name and geo-location of the phone itself may also be sent with the encrypted data.

The App may exist in a number of variants: for example an App for Customs Officers will be designed to provide direct feedback that the product bearing the label is or is not counterfeit, whereas a customer version of the App may have links to the retailer's website for that product, perhaps to register customer feedback or advise customer care information or allow regular customers to be recognised and accrue loyalty bonuses.

As noted above, no data that could compromise the brand owner's product security is stored in the App.

When the server 37 receives the customer image via the Internet, it unscrambles the secure package and does the following:
   checks that the data package meets the data requirement and has not been compromised, if the package has been compromised it generates an alarm.
   locates the product code from within the customer image.
   uses the product code to locate the label template showing where the serial number and random data are located
   reads the serial number from the customer image and uses this to retrieve the production image of the label stored when the product was manufactured, locates the random data in the production image and checks that it matches the random data in the customer image sent by the App.

If the random data from the production image and the customer image match then the scan is registered, the fact the label has been scanned is recorded and the server generates billing information appropriate for the brand owner. This may include item data (such as product and serial number) to enable the brand owner to check the location of the item for grey market activity, update the data in customer loyalty programs or record multiple uses of the same label data.

If the random data does not match, or, for example, if it appears that the validation exercise includes the second or third time the label has been scanned, then the occurrence of a suspect counterfeit is registered and a series of actions are generated according to the wishes of the brand owner, for example the automatic transmission of an email to the brand owner showing that a suspect item was located by a user in a given place at a given time.

Figure 9:
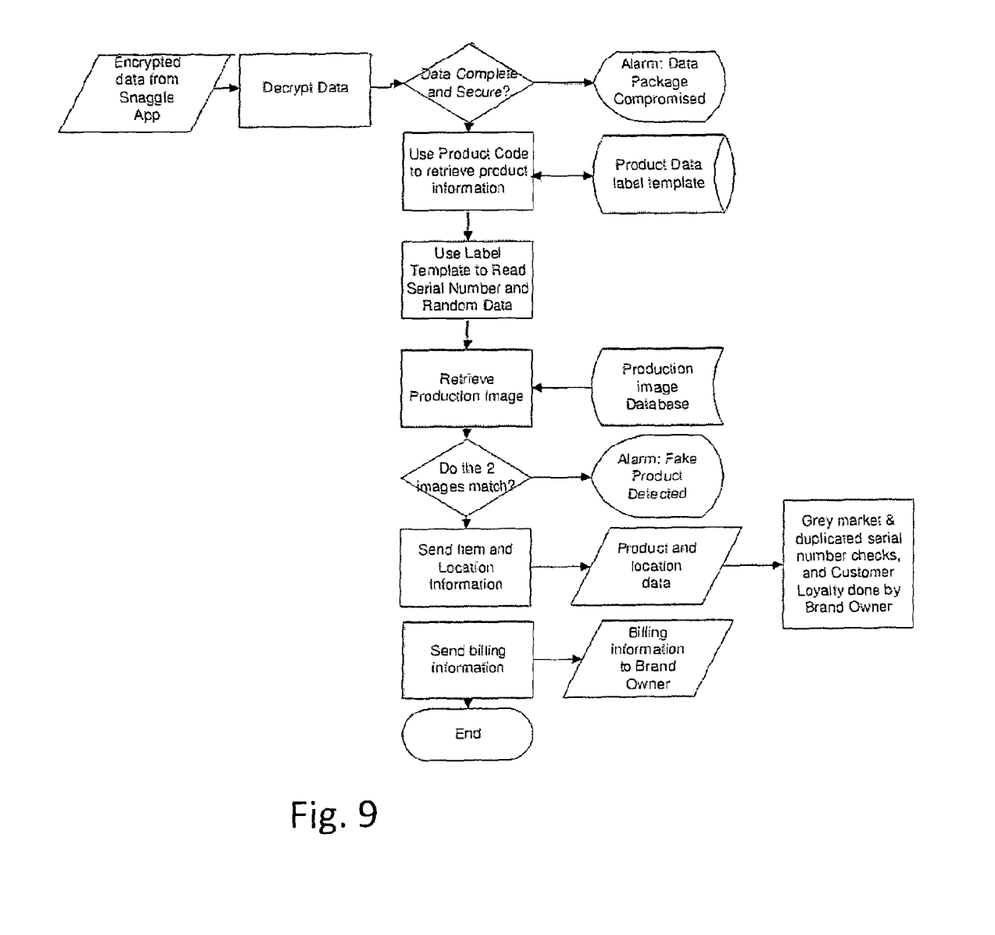
FIG. 9 is a flow chart showing the principal steps in the validation exercise illustrated in FIG. 8.

FIG. 9 is a flow chart showing this validation process and the actions taken by the server 37.

Figure 10:
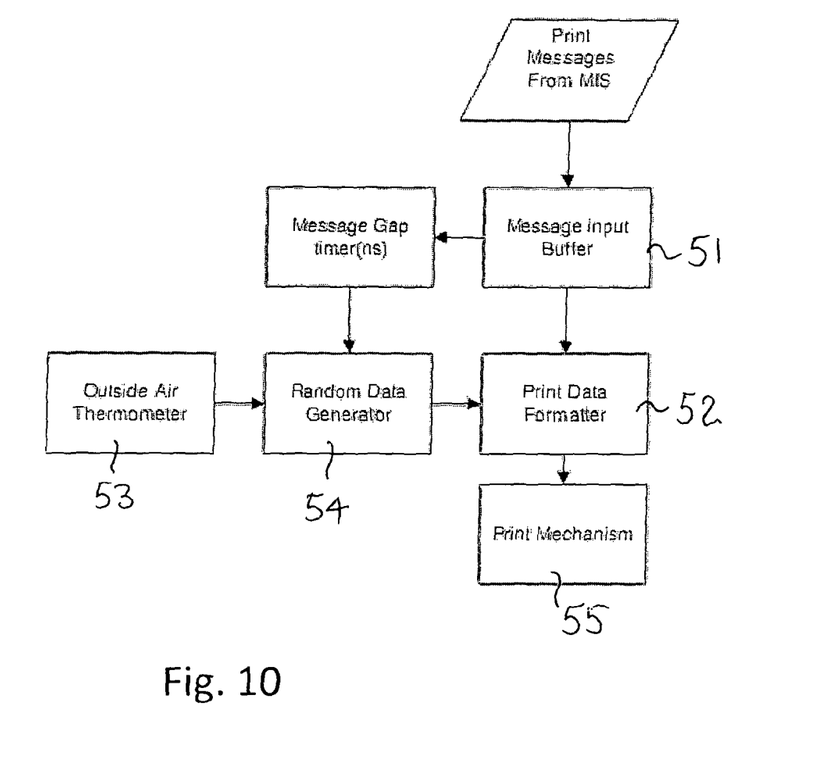
FIG. 10 is a block diagram illustrating one way of generating random data and incorporating it into a coded marking.

FIG. 10 shows diagrammatically how printer 33 may be driven to incorporate the random data into label 34. While it is possible to generate the random data anywhere in the manufacturers production system, doing so in the final label printer is preferred. The reason for this is that the generation of random data within the brand owner's management information system (MIS) would mean that any unauthorised access to the manufacturing system could allow the dissemination of the randomise algorithm or the list of random data numbers associated to individual products and their serial numbers, thus compromising that particular product line.

It is accordingly preferred to use most such printers are low tech devices with programs stored in EPROM; this makes them harder to hack than general purpose computer systems used in an MIS.

The normal method of generating intentionally random data from software is to use a pseudo random number generator, however these types of algorithms produce the same random sequence of data each time they are executed.

A preferred method shown diagrammatically in FIG. 10 is to use an external event or phenomena that cannot be predicted or well controlled, like recording the time between print commands. For example if a print command arrives from the MIS to the printer at a typical one second interval but the arrival time is measured to single nanosecond resolution then the last two digits of measured time will be unpredictable even to someone who had reverse engineered the software in the label printer. In FIG. 10, this is done by a message gap timer so connected to a message input buffer 51 connected between the manufacturing or formation system 35 and a print data formatter 52 forming part of printer 33. This can be further randomised by incorporating the temperature of the air outside of the printer from a thermometer 53, or some other variable sensor. These digits derived from extreme measurements of external events or phenomena can be used directly or used to seed further algorithms to obfuscate the random data generation in data generator 54.

The random data is then fed to the print data formatter 52, which data then drives the print mechanism 55 forming part of printer 33.

The server 37 may store or access six main databases when the system is implemented.

Brand owner data
Validated Printers, their locations and operating times
Product Label Templates
Production Images
App users
Record of Validations The size of the images being evaluated may be relatively small; for example, the image in FIG. 3 comprises 4 kb of data—similar in size to a small "plain text" email. This production image can be stored on the image server 37 for comparison with the customer image. Software can easily verify that all of the data is correct. In the case of dispute, for example where a counterfeiter has duplicated a label, other artefacts such as the position of ink splashes in either image, can be used during a comparison of the image to determine the legitimacy of a product.

The invention claimed is:

1. A method of monitoring a movable article which comprises applying coded data in the form of a printed visually perceptible marking, storing details of the marking in a high capacity memory store, transmitting data corresponding to the marking from the location of the article to a remote computer via a wide area communications network, transmitting simultaneously details concerning the location of the article to the remote computer, retrieving the coded data from the transmitted data, and evaluating whether the coded data matches coded data stored in the high capacity memory store, wherein the data corresponding to the marking is a pictorial image of that marking obtained by using a camera, and characterized in that the marking includes data randomly generated by imprecision in the printing process used to produce the marking.

2. A method according to claim 1 wherein the camera is a component of a device selected from the group comprising a mobile telephony handset and a mobile computing device.

3. A method according to claim 2 wherein, following the evaluation, a message is generated by the remote computer as to the result of the evaluation and transmitted to the device.

4. A method according to claim 2 wherein the device is programmed to perform, when triggered to do so by a user, the steps of capturing a digitized image of the coded data and sending the digitized image, together with data corresponding to the geographical location of the device, to the remote computer via a network.

5. A method according to claim 1 wherein the coded marking is applied to at least one of the article itself, a label attached thereto, packaging of the article, a container containing at least one of the articles, and documentation related to the article.

6. A method according to claim 5 wherein the marking is applied by a digitally controlled printer and the data transmitted to the printer includes some randomly generated data.

7. A method according to claim 5 wherein the coded data includes data relating to visible non-typographic non-alphanumeric marks on the article.

8. A method according to claim 1 wherein the visually perceptible marking includes typographic characters from a known standard set thereof together with a typographic character formed analogously to, but not forming part of, that standard set.

9. A method of uniquely identifying an article which comprises applying to one of the article and a label for attachment to the article, a visually perceptible marking including intended alphanumeric or coded markings and unintended random non-alphanumeric markings, capturing an image of the visually perceptible marking, and storing data corresponding to the components of that image in association with data relating to the article itself.

10. A method according to claim 9 wherein the unintended random non-alphanumeric marking corresponds to imprecision in the location of components of the alphanumeric or coded marking.

* * * * *

UNITED STATES PATENT AND TRADEMARK OFFICE
CERTIFICATE OF CORRECTION

PATENT NO. : 9,010,654 B2
APPLICATION NO. : 14/114384
DATED : April 21, 2015
INVENTOR(S) : Alan Joseph Bell Page 1 of 1

It is certified that error appears in the above-identified patent and that said Letters Patent is hereby corrected as shown below:

Title Page, Item (54) and in the Specification at Column 1, line 1, Title, delete "MONITORING MOVING ARTICLES" and insert in place thereof --MONITORING MOVABLE ARTICLES--

Signed and Sealed this
Twenty-third Day of June, 2015

Michelle K. Lee
*Director of the United States Patent and Trademark Office*